April 6, 1926.

E. ROIRANT 1,579,396

AUTOMATIC MACHINE FOR MANUFACTURING BLOWN GLASS ARTICLES

Filed March 20, 1924   2 Sheets-Sheet 1

Inventor
Emile Roirant
per R. S. Watro
Attorney.

April 6, 1926.
E. ROIRANT
1,579,396
AUTOMATIC MACHINE FOR MANUFACTURING BLOWN GLASS ARTICLES.
Filed March 20, 1924 2 Sheets-Sheet 2
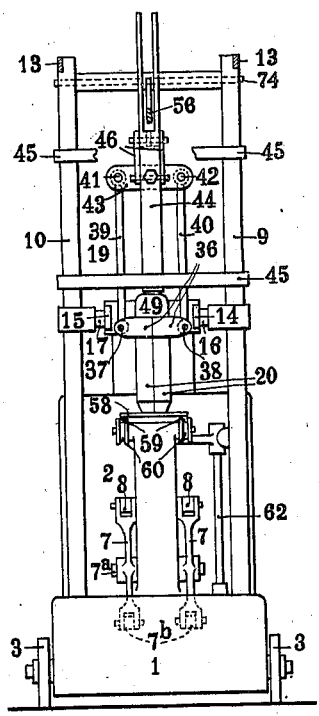
Inventor
Emile Roirant
per R.S. Wakers
Attorney Patented Apr. 6, 1926.

1,579,396

UNITED STATES PATENT OFFICE.

EMILE ROIRANT, OF PARIS, FRANCE, ASSIGNOR TO SOCIÉTÉ ANONYME D'ETUDES ET DE CONSTRUCTIONS D'APPAREILS MECANIQUES POUR LA VERRERIE, OF PARIS, FRANCE.

AUTOMATIC MACHINE FOR MANUFACTURING BLOWN-GLASS ARTICLES.

Application filed March 20, 1924. Serial No. 700,682.

*To all whom it may concern:*

Be it known that I, EMILE ROIRANT, of 3 Rue de Castellane, Paris, France, citizen of the French Republic, have invented Automatic Machines for Manufacturing Blown-Glass Articles, of which the following is a full, clear, and exact description.

The present invention has for its object to provide an automatic machine for the mechanical manufacture of blown glass objects and especially bottles.

By its special combination, this machine effects the manufacture in an entirely automatic manner by the following successive operations:—

The drawing or suction in the glass furnace of the desired quantity of glass necessary for the manufacture of each bottle, the delivery of this glass to a finishing mould, blowing in this mould, and finally the expulsion of the finished bottle out of the machine.

The new machine, the construction of which is much more simple than that of machines hitherto constructed or proposed and the output of which is greater, offers this essential advantage, that it may be employed with all kinds of existing furnaces. Further, it may be stopped or put out of work instantly during any period, short or prolonged, without its stoppage and its later resumption of work influencing or modifying in any manner the working of the furnace by which it is fed and without any other action than its arrest or its putting into action again.

The filling of the parison mould is effected by the known means of suction, but this parison mould is operated by driving mechanism permitting it to suck up the glass directly in the furnace itself without the necessity for any anti-chamber, or of any intermediate space, which avoids conducting complications and difficulties which take place in all machines actually known in the automatic manufacture of bottles.

Another important advantage of the present machine is the fact that the collar mould, after having delivered the parison to the finishing mould, is immediately put back into action with the parison mould, so that this latter may draw in a new charge of glass whilst the blowing of a bottle is being effected. The machine thus realizes, simultaneously an operation of suction and an operation of blowing and permits the new parison to replace immediately in the finishing mould, the bottle which has been blown without any loss of time. The output is therefore maximum and is only limited by the cooling means employed.

The machine constructed according to the present invention is of the unitary type, that is to say it only comprises a single set of moulds, but the space occupied by it being small, there can always be arranged a sufficient number of similar machines in front of the furnace. This method of operating assures great facility in the manufacture for it enables different types of bottles to be produced simultaneously and at the same time it is very satisfactory because the damage of one machine only causes the stoppage of that machine without the furnace or the other machines being influenced thereby.

This machine has also this characteristic, that it causes at the desired times, the automatic opening and closing of a shutter mounted in front of the opening through which the parison mould is introduced into the furnace; this opening is effected at the moment when the parison mould is about to enter the furnace and the closing of this shutter takes place as soon as the parison mould has left the furnace. It is thus able to avoid, not only loss of heat from the furnace but also the heating by radiation of the parts of the machine.

Finally the machine is constructed in such a manner that the moving parts, that is to say the moulds, are separated from the whole of the controlling parts in such a manner that these latter are separated from the furnace; further these controlling parts have only one set of moulds to move, they are consequently but little subject to wear and only require a relatively small upkeep.

By way of example, the accompanying drawing shows one method of carrying the invention into effect.

In this drawing Fig. 1 is a longitudinal section, Fig. 2 is a plan and Fig. 3 is an end view.

Fig. 4 is a detail view, to a larger scale, of the parison mould.

Figs. 5 to 7 are detail views of the apparatus for opening the collar mould; Fig. 5 is a lateral elevation, Fig. 6 is a horizontal section showing the collar mould closed, Fig. 7 is a horizontal section of the collar mould open.

Fig. 8 is a horizontal section, to a larger scale, on the line A—A of Fig. 1.

Figure 1:
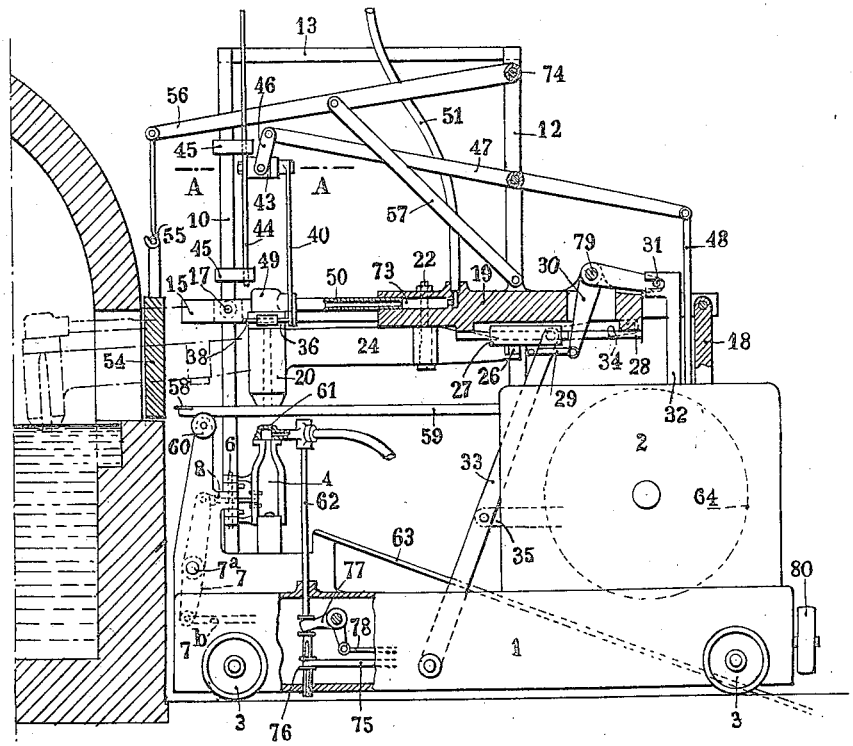

As seen in the drawing, the machine is composed of a base 1, behind which is arranged a case 2 enclosing all the driving or controlling parts. This base rests upon the ground, or upon rollers, by means of four wheels 3 which enable the machine to be brought in front of the furnace or to be withdrawn in an easy and rapid manner.

Upon the front part of the base is arranged the finishing mould made in two parts 4 and 5 (Figs. 1 and 2), hinged upon an axle 6. The opening and closing movement of each of the parts 4, 5 of this finishing mould is controlled by a link 8 pivoted to a lever 7 which is movable around an axle 7ª and is operated by a link 7ᵇ; this latter receives an alternate rectilinear motion from any suitable driving mechanism, not shown upon the drawings and located within the case 2.

Four vertical columns 9, 10, 11 and 12 connected in pairs by cross ties 13 serve as supports for the other parts of the machine. The front columns 9 and 10 support two parallel bars 14, 15 by means of trunnions 16, 17, around which they can oscillate. These bars are supported at the back by a link 18 receiving at certain times upward and downward movements giving a certain inclination to the bars 14, 15. This alternate movement is communicated to the link 18 by any suitable controlling mechanism, not represented upon the drawing, and located in the interior of the case 2.

These bars 14 and 15 constitute a sliding way upon which a carriage 19 may be moved; this carriage receives a to and fro movement which is communicated to it by two links 34 (Fig. 1), mounted upon its two faces and articulated to levers 33 driven by a link 35 which receives an alternate movement from a driving mechanism, not represented upon the drawing and located in the case 2.

Upon the carriage 19 is mounted the parison mould 20 consisting of two shells carried respectively by the arms 23, 24 movable around the axles 21, 22; the opening and closing of this parison mould are controlled by the following apparatus; the arms 23, 24 are connected, at one of their ends, by links 25, 26, to a slide 27 movable on a slide bed 28 fixed upon the carriage 19. This slide 27 receives a to and fro motion from a link 29 and a bent lever 30 hinged upon an axle 79 carried by the carriage 19. One of the arms of this lever carries a pin 31 adapted to engage in a fork carried by a rod 32 which communicates to it the desired movement. This rod 32 receives an alternate up and down rectilinear movement which is communicated to it by suitable driving mechanism, not shown in the drawings and located within the case 2. An examination of Figs. 1 and 2 shows clearly how the opening and the closing of the parison mould 20 is effected under the effect of moving the slide 27 on its bed 28.

Figure 2:
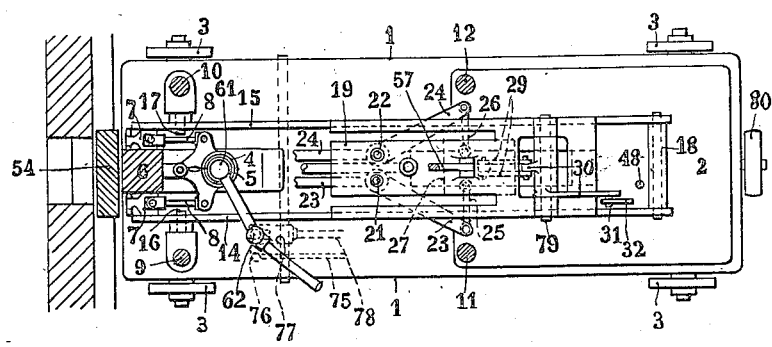

It is to be noted, as seen in Fig. 1, that in the closed position of the parison mould the links 25, 26 occupy a normal position to the direction of movement of the carriage, in such a manner that the said links are opposite to any opening movement of the mould and thus retain this latter firmly closed during this horizontal movement.

A collar mould 36 made in two parts rests in the upper part of the parison mould 20 (Fig. 4). In the position shown in Figs. 1 and 4, these two parts of the collar mould are engaged respectively upon the pins 37 and 38 carried by two hanging rods 39 and 40 (Figs. 1, 3, 5 and 6) hinged around axles 41, 42, which are fixed upon a part 43 (Figs. 1 and 8), carried by a bar 44 movable vertically in guides 45 carried by the columns 9, 10. This bar 44, and consequently the hanging rods 39 and 40, may be raised or lowered at the desired times by links 46 (Fig. 1) and a lever 47 driven by a rod 48, which receives an alternate up and down rectilinear movement which is communicated to it by any suitable driving mechanism, not shown and located like the others in the case 2.

The opening of this collar mould 36 takes place, at the end of its descending course, by the following arrangement (Figs. 5 to 7):

In front of the pins 37, 38, when the collar mould is at the lower part of its course, are mounted two moving parts or levers 65, 66 carried by two vertical rods 67, 68, capable of receiving a rotary motion in opposite directions so that these moving parts or levers 65, 66 can, when they occupy the position represented in Fig. 7, cause the opening of the mould.

These two rods control each other for example by means of toothed sectors 69, 70 and one of these rods carries an arm 71 to which is hinged a link 72 operated by any suitable moving mechanism, not represented, located in the case 2.

A cover or bell is arranged above the collar mould 36 (Figs. 1 and 4) and enters this latter. This cover or bell is connected by a tube 50 to a channel 73 formed in the carriage 19 and in communication, by a flexible pipe 51, with a reservoir, not shown, in the interior of which a partial vacuum has been created. Preferably the tube 50 can telescope in the channel 73 with the object of permitting the bell 49 to rest always centred upon the parison mould notwithstanding the effects of the arms carrying the shells of the parison mould.

The interior of the bell 49 is in communication, by the openings 52, with the collar mould 36 and the parison mould 20. The piercing mandrel 53 is mounted upon the said bell 49.

The shutter 54 of the opening of the furnace is suspended from a hook 55 mounted at the end of a lever 56 movable around an axle 74 carried by the columns 11 and 12; this lever is controlled by a link 57 pivoted upon the carriage 19 so that, when this latter moves forward towards the furnace, the shutter 54 is raised to allow the introduction of the parison mould 20 into the interior of the furnace and it closes during the reverse movement.

A knife 58, adapted to cut the glass at the bottom of the parison mould 20 after the suction, is mounted upon two parallel bars 59 which are guided upon the rollers 60 and receive, at the desired time, a rectilinear to and fro motion communicated by driving mechanism, not shown and located in the case 2.

Finally a bell 61 may cap the top of the finishing mould 4. This bell is in communication with a reservoir of compressed air, not shown upon the drawing, and allows the admission of compressed air to the interior of the finishing mould 4 at the moment when the blowing of the bottle should take place.

So as to be able to adapt itself at the desired times to the finishing mould, the bell 61 is mounted upon an axle 62 (Figs. 1 and 2) carried by the frame of the machine and capable of receiving a double movement; an angular movement and an up and down vertical movement.

The angular movement is communicated by a link 75 hinged to an arm 76 keyed upon the axle 62, the vertical motion is transmitted by a bent lever 77 to which is pivoted a link 78. The two links 75, 78 receive an alternate rectilinear motion from driving mechanism, not shown upon the drawing and located in the case 2.

When the blowing of the bottle has been finished, the bell 61 receives an angular motion which has the effect swinging the bottle, which falls upon an inclined way 63 and is thus transported to the rear and out of the machine. The various links or rods 7$^b$, 18, 32, 35, 48, 59, 72, 75, 78 which communicate the movement to the various parts of the machine, as previously explained, may be controlled for example by grooved cams, not shown, having a suitable profile upon one or several plates or drums 64 receiving a rotary motion from a pulley 80 by means of a transmission, not shown.

The working of this machine is as follows:—

The machine being placed in front of the furnace and the parts occupying the position shown in Fig. 1, the first movement is controlled by the link 35 which, acting upon the levers 33, causes to advance towards the furnace the carriage 19 carrying the parison mould 20 held in its closed position and the collar mould 36 inserted in the parison mould.

From the commencement of this movement of the carriage 19 the shells of the collar mould disengage from the pins 37, 38 of the hanging rods 39, 40 by which they are suspended; on the other hand the link 57, acting upon the lever 56, raises the shutter 54 and the parison mould enters the interior of the furnace. At the end of this movement the link 18 receives an upward motion so that the bars 14 and 15 and the parts which they carry take, in the interior of furnace as represented in Fig. 1 in broken lines, an inclined position so that the parison mould 20 plunges into the fused glass contained in the furnace. At this moment suction is produced by means of the tubes 51, 50 of the bell 49 in the parison mould 20 and the glass rises in this latter.

When the filling of the parison mould is finished the suction is stopped, the link 18 receives a movement from top to bottom and returns the bars 14, 15, into their horizontal position, the parison mould 20 then re-takes its vertical position. Immediately the knife 58 advances and cuts the glass at the bottom of this mould; this operation is effected in the interior of the furnace. The link 35 finally returns to the rear the combination of the carriage 19 and the parison mould 20, this latter then leaves the furnace, the shutter 54 is closed and the two parts of the collar mould 36 engage on the pins 37, 38 carried by the hanging rods 39, 40. After a slight stop the rod 32 receives an upward movement and produces, by means of the bent lever 30, the link 29, the slide 27 and the links 25, 26 the opening of the parison mould 20; the parison remains suspended from the collar mould which itself is suspended, as above stated, by the pins 37, 38 on the hanging rods 39, 40. At the same time as the parison mould 20 is open, the finishing mould is also opened by the action of the lever 7. On the other hand the bell 61 carried by the axle 62 has turned away from the axle of the finishing mould and has thrown, upon the slide, away 63 the bottle previously blown.

Almost simultaneously the rod 48 receives an upward motion and communicates, by means of the lever 47, a descending motion to the hanging rods 39, 40 and to the collar mould 36 suspended on this latter. The parison carried by this collar mould likewise descends and enters between two parts of the finishing mould then open. It is to be noted that, during its descending movement, the collar mould disengages itself from the bell 49 and mandrel 53 which remain stationary. As soon as the collar mould 36 has arrived at the bottom of its travel, the finishing mould 4, 5 closes upon the parison; then the collar mould is opened by the moving parts or levers 65, 66 (Fig. 7), and is raised to its initial position by the links 39, 40 which receive an upward movement transmitted to them by the lever 47 and the rod 48.

The collar mould being thus returned to its initial position, the parison mould closes upon it under the action of the rod 32 to which is communicated a descending motion.

The carriage 19 then receives a new impulse towards the furnace, and at the same time the blowing bell 61 comes into position above the finishing mould and permits the admission of compressed air which effects the blowing of the bottle. A new suction takes place in the parison mould 20 upon its introduction into the furnace; the parison formed is transmitted above the finishing mould, descends to take the place of the bottle which has been blown during this time and so on.

It will be understood by the above description that no time is lost and that the moulds fulfil constantly their office without waiting and without useless rests. The output of this machine is therefore very considerable.

The above arrangements are only given by way of example; the forms, materials and dimensions may be varied in all cases without changing the principle of the invention.

Claims:—

1. An automatic machine for the mechanical manufacture of blown glass articles comprising: a rough-shaping mold, means for imparting a horizontal displacement to said mold, means for giving this mold an ascending and descending movement at one of the ends of its rectilinear course, a finishing mold, a ring or collar mold, means for alternately bringing the ring mold into cooperation with the rough-shaping mold for the formation of the parison or preliminary mass of glass, and with the finishing mold for the conveyance of the said mass to the latter, a blowing bell, and means for bringing this bell to the finishing mold after the departure of the ring mold on delivery of the parison to the said finishing mold.

2. A machine according to claim 1 comprising: a carriage for supporting the rough-shaping mold, a slide movable on this carriage, bent levers mounted to oscillate on the said carriage 19, said levers bearing at one of their ends the chills of the rough-shaping mold, connecting rods between the other ends of said levers and the said slide 27, another bent lever likewise borne by the said carriage 19, a pin on one of the branches of the latter lever, a connecting rod between the other branch of said lever and the said slide, and a driving rod comprising a fork in which the said pin is engaged at the end of the return stroke of the carriage.

3. A machine according to claim 1 comprising: a carriage carrying the rough-shaping mold, a slide movable on this carriage, bent levers mounted to oscillate on the carriage; said levers carrying at one of their ends the chills of the rough-shaping mold, connecting rods between the other ends of said levers and the said slide, the lengths of said connecting rods being determined in such a way that they form an extension of each other when the two chills of the rough-shaping mold are applied against each other, another bent lever also borne by the carriage, a pin on one of the branches of the latter lever, a connecting rod between the other branch of said lever and the said slide, and a driving rod comprising a fork in which the said pin is engaged at the end of the return stroke of the carriage.

4. An automatic machine for the mechanical manufacture of blown glass articles comprising: a rough-shaping mold, means for imparting a horizontal movement to said mold, means for imparting to said mold a descending and ascending movement at one of the ends of its rectilinear course, a finishing mold, a ring or collar mold, a slide, a suction bell carried by said slide and intended to adapt itself to the collar or ring mold, means for bringing said bell in communication with a vacuum producing apparatus, a chuck attached to said bell, hanging connecting rods susceptible of being vertically displaced projections on the lower portions of said rods so arranged as to receive the chills of the ring mold at the end of the return stroke of the carriage, means for imparting the vertical movement to said hanging connecting rods, said means being suited to disengage the ring mold from the suction bell and the chuck and to bring it into cooperation with the finishing mold and to bring back the ring mold, after opening, into cooperation with the suction bell, a blowing bell, means for bringing this bell to the finishing mold after the departure of the ring mold which has just delivered the parison to said finishing mold.

5. A machine according to claim 4 comprising: a channel provided in the said carriage 19, a vacuum reservoir, means for bringing this channel into communication with said vacuum reservoir, a tube 50 bearing at one of its ends the said suction bell and whose other end can slide in the said channel 73.

6. A machine according to claim 1, comprising: a screen or shield adapted to close the working hole of the furnace between the successive introductions of the rough-shaping mold into the furnace, and means for controlling the raising and lowering of said screen or shield by one of the movable parts of the machine.

7. A machine according to claim 1, comprising: a screen or shield adapted to close the working hole of the furnace between the successive introductions of the rough-shaping mold into the furnace, means for operating the raising and lowering of said screen or shield by one of the movable parts of the machine, a lever from which said shield or screen is suspended, a connecting rod which connects the said carriage to the lever, the articulation points of said connecting rod being arranged so that towards the end of the forward stroke of the carriage the said lever receives a very slight displacement and the screen is thus kept above the said working hole.

The foregoing specification of my "automatic machine for manufacturing blown glass articles", signed by me, this 6th day of March, 1924.

EMILE ROIRANT.